(12) United States Patent
Gasch et al.

(10) Patent No.: US 11,009,416 B2
(45) Date of Patent: May 18, 2021

(54) DEVICE FOR THE NON-INTRUSIVE MEASUREMENT OF THE PRESSURE OF A FLUID INSIDE A CYLINDRICAL CASING USING CHAIN LINKS

(71) Applicant: ABB Schweiz AG, Baden (CH)

(72) Inventors: Armin Gasch, Speyer (DE); Paul Szasz, Plankstadt (DE)

(73) Assignee: ABB SCHWEIZ AG, Baden (CH)

( * ) Notice: Subject to any disclaimer, the term of this patent is extended or adjusted under 35 U.S.C. 154(b) by 341 days.

(21) Appl. No.: 16/000,909

(22) Filed: Jun. 6, 2018

(65) Prior Publication Data

US 2018/0283968 A1    Oct. 4, 2018

Related U.S. Application Data

(63) Continuation of application No. PCT/EP2016/080226, filed on Dec. 8, 2016.

(30) Foreign Application Priority Data

Dec. 9, 2015  (DE) .................... 10 2015 121 425.3

(51) Int. Cl.
*G01L 9/00* (2006.01)
*F02M 65/00* (2006.01)

(52) U.S. Cl.
CPC .......... *G01L 9/0001* (2013.01); *G01L 9/0026* (2013.01); *F02M 65/003* (2013.01)

(58) Field of Classification Search
None
See application file for complete search history.

(56) References Cited

U.S. PATENT DOCUMENTS

| | | | |
|---|---|---|---|
| 3,866,473 A | 2/1975 | Teitelbaum et al. | |
| 4,146,875 A | 3/1979 | Beatson et al. | |
| 4,296,635 A | 10/1981 | Claassen et al. | |
| 7,093,496 B2 | 8/2006 | Hindman | |
| 9,746,386 B2* | 8/2017 | Jenkins | G01L 1/22 |
| 2005/0235755 A1 | 10/2005 | Hindman | |
| 2015/0226287 A1 | 8/2015 | Brodziak | |
| 2018/0292289 A1* | 10/2018 | Hoffman | G01L 9/0026 |

FOREIGN PATENT DOCUMENTS

| | | |
|---|---|---|
| CN | 2632635 Y | 8/2004 |
| CN | 202177476 U | 3/2012 |
| CN | 103063341 A | 4/2013 |
| CN | 104641145 A | 5/2015 |
| DE | 2647470 A1 | 4/1978 |
| EP | 0720006 A1 | 7/1996 |
| JP | 5363267 U | 5/1978 |

* cited by examiner

*Primary Examiner* — Natalie Huls
*Assistant Examiner* — Jermaine L Jenkins
(74) *Attorney, Agent, or Firm* — Leydig, Voit & Mayer, Ltd.

(57) ABSTRACT

A pressure measurement device for determining a pressure of a fluid located inside a cylindrical casing includes: at least one sensor for determining a force acting thereon; and a clamp for peripheral attachment to the casing. The at least one sensor is arranged inside the clamp and is operatively connected thereto. The clamp includes a peripheral link chain having chain links that are pivotably coupled to one another at end joints, and a closure device that interacts with a first chain link and a final chain link.

9 Claims, 1 Drawing Sheet

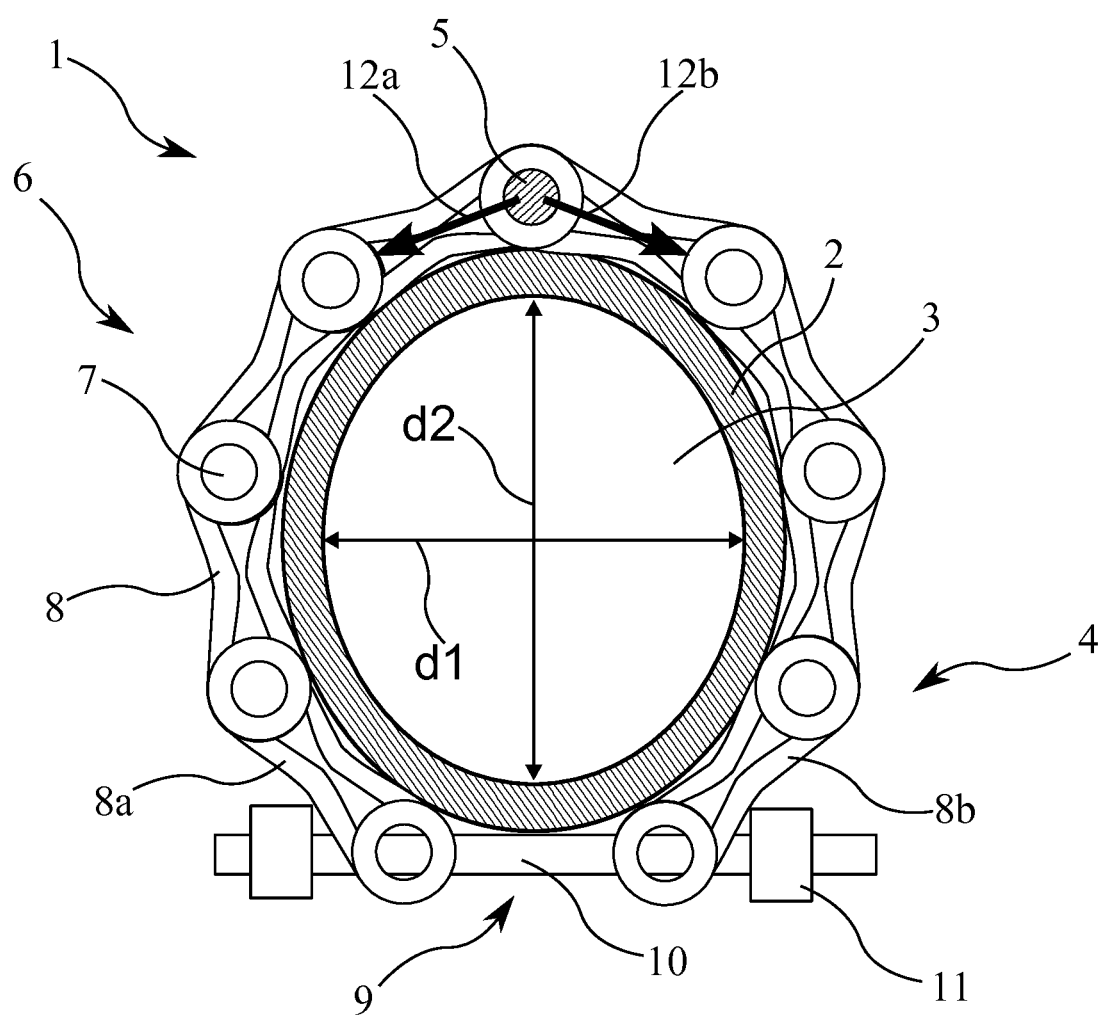

DEVICE FOR THE NON-INTRUSIVE MEASUREMENT OF THE PRESSURE OF A FLUID INSIDE A CYLINDRICAL CASING USING CHAIN LINKS

CROSS-REFERENCE TO PRIOR APPLICATION

This application is a continuation of International Patent Application No. PCT/EP2016/080226, filed on Dec. 8, 2016, which claims priority to German Patent Application No. DE 10 2015 121 425.3 filed on Dec. 9, 2015. The entire disclosure of both applications is hereby incorporated by reference herein.

DESCRIPTION

The invention relates to a pressure measurement device for determining the pressure of a fluid located inside a cylindrical casing, said device comprising at least one sensor by means of which a force acting thereon can be determined, and comprising a clamp for peripheral attachment to the casing, the sensor being arranged inside the clamp and being operatively connected thereto.

BACKGROUND

The field of application of the invention relates to a plurality of industrial fields, such as process control engineering, but also to non-industrial fields, such as monitoring gas or water mains in structural engineering. In this case, sensors are often used that are guided in an intrusive or invasive manner through a casing of the fluid to be measured, for example through a line that conveys a fluid flow, or through a container that stores a fluid, the casing being cylindrical at least in portions, and often having a circular or oval cross-section.

However, introducing a sensor into the fluid through a corresponding opening is associated with disadvantages. In addition, a suitable opening can often be made in the casing only with difficulty. The measurement diaphragm of the pressure sensor is often separated from the process by means of a hydraulic circuit filled with oil, as a result of which, owing to thermal expansion of the oil, the feasible temperature range of the sensor is often greatly limited.

As a result, non-intrusive or non-invasive pressure measurement assemblies are found in the prior art, in the case of which assemblies a clamp is attached, in a tensioned manner, to the outside of the casing, for example around the line, a pressure sensor being arranged in the clamp. If the casing then deforms due to increasing or falling pressure, this deformation can thus be measured by means of a force acting on the sensor.

U.S. Pat. No. 7,093,496 B2 discloses a non-intrusive pressure measurement assembly in which a basically circular clamp is closed by a connection means that comprises a pressure sensor. Said connection means is not located in the circumference of the basically circular clamp, but rather is offset radially outwardly with respect thereto. If the clamp is then pushed open as a result of expansion of the line to which it is attached, the connection means comprising the pressure sensor is subjected not only to a force extending axially along the connection means, but also to a load that is oriented perpendicularly thereto and by means of which the connection means is buckled or bent. This results in particular in non-linear stress on the pressure sensor, and therefore said sensor essentially provides incorrect values.

EP 0 720 006 B1 discloses a method and a device for measuring pressure fluctuations of a fluid in a cylindrical pipeline, pressure sensors again being assigned to a connection means that is radially spaced from the otherwise substantially circular structure of the device. Non-linear stress on the pressure sensors, and thus incorrect evaluation of the pressure, results in this case too.

SUMMARY

In an embodiment, the present invention provides a pressure measurement device for determining a pressure of a fluid located inside a cylindrical casing, the device comprising: at least one sensor configured to determine a force acting thereon; and a clamp configured for peripheral attachment to the casing, the at least one sensor being arranged inside the clamp and being operatively connected thereto, wherein the clamp comprises a peripheral link chain comprising chain links that are pivotably coupled to one another at end joints, and a closure device configured to interact with a first chain link and a final chain link.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic front view of a pressure measurement device according to the invention, on an oval casing.

DETAILED DESCRIPTION

In an embodiment, the present invention includes the technical teaching that a clamp comprises a peripheral link chain consisting of chain links that are pivotably coupled to one another at end joints, and a closure device that interacts with a first chain link and a final chain link.

This type of arrangement allows the pressure sensor, accommodated inside the clamp, to be arranged very close to and within the perimeter of the clamp, in the orientation of which the force that is to be measured acts. As a result, it is possible to prevent the expansion of the casing being transmitted to the pressure sensor in a non-linear manner as a result of shearing forces, or to prevent said sensor from being buckled or bent. The peripheral orientation of the clamp essentially follows the contour of the casing, provided that said contour is convex.

In this case, it is preferable for the closure device to be formed as a tensioning device for closing and tensioning the link chain.

It is thus simple to attach the pressure measurement device to a casing, by means of guiding the open link chain around the casing and connecting said chain at the closure device and optionally tensioning said chain using a corresponding mechanism. Tensioning the clamp at a specified tensioning force ensures that deformations of the casing are directly transmitted thereto.

A further advantage is that the modular structure of the clamp in the form of chain links that are pivotably coupled to one another means that casings of in principle any desired convex geometry can be enclosed in an almost form-fitting manner. The pressure measurement device is thus suitable not only for circular casings, but also for oval or differently shaped, for example angular, casings.

According to a very particularly preferred variant of the invention, the at least one sensor is formed as a load pin and is arranged in at least one joint and is thus operatively connected as a swivel pin.

This advantageously ensures that the pressure sensor measures the forces inside the clamp, caused by the deformation of the casing, in a direct and linear manner. This advantage is surprising in particular because the location at which the pressure sensor is arranged inside the clamp should intuitively be of secondary importance. However, it is precisely the combination of the arrangement inside a joint with the function both as a pressure sensor and as a swivel pin for said joint that leads to this surprising advantage.

The at least one load pin is preferably arranged in a central chain link of the link chain. In this case "central" means the center between the first and the final chain link. The closure device is arranged between said two chain links. If further chain links are intended to be present after the final chain link, said chain links are not part of the clamp. The load pin is therefore approximately opposite the closure device when the chain is closed. The advantage in this case can be considered that of possible pressure peaks or asymmetries in the loading inside the clamp, which from the closing mechanism of the closure device, in particular when said means is formed as a tensioning device, being reduced over the maximum distance, specifically half the length of the link chain, and moreover being compensated by the symmetrical arrangement.

A link chain comprising at least three chain links is particularly preferred. Three, four or more chain links make it possible for all geometric changes in the casing that occur in practice to be transmitted to the clamp and measured by the sensor.

Clamps of which the link chains comprise at least eight chain links are preferred in particular. Eight or more chain links, preferably of equal length, make it possible to cover circular or oval or elliptical casings in a manner that follows the contour very precisely.

In this case, the chain links are preferably mirror-symmetrical about the plane in which the axes of rotation of the two articulated rollers of the chain link are located. Such a design is conventional in the prior art and results in high mechanical resilience of each chain link.

Furthermore, it is particularly preferable for the link chain to be formed as a plate link chain. A design of this kind is particularly simple and in particular, if required, the sensor in the form of a load pin can be arranged very easily as a pin between two chain links, where said pin then interacts directly with the receiving portions of two chain links provided for mounting the pin.

In a preferred embodiment of the invention, the closure device is formed as a clamping pin, by means of which the first chain link is releasably connected to the final chain link. As a result, the clamp can advantageously be manually fastened and released again by means of few hand movements.

It is further preferable for the tensioning device to comprise at least one screw element for tensioning the tensioning device in a manually adjustable manner. As a result, it is advantageously possible for the force, by which the clamp is pre-loaded around the casing, to be set when attaching the clamp, by means of adjusting the screw element, for example a nut.

FIG. 1 shows a pressure measurement device 1 for measuring the pressure of a fluid 3 located inside a cylindrical casing 2. The casing 2 is part of an elliptical pipeline having a major axis d2 and a minor axis d1. In this case, the cylindrical casing 2 may be deformed by the pressure of the fluid 3 located in the casing 2. A clamp 4 is arranged in a tight-fitting manner around the casing 2, in which clamp a sensor 5, formed as a load pin, is arranged and thus operatively connected thereto. A force acting inside the clamp 4 is thus received by the sensor 5 and provides conclusions regarding the pressure of the fluid 3.

The clamp 4 comprises a peripheral link chain 6 that is formed as a plate link chain and consists of chain links 8 that are pivotably coupled to one another at end joints 7. In this case, the first chain link 8a and the final chain link 8b interact with a closure device 9 associated with the clamp 4.

The closure device 9 is formed as a tensioning device for closing and tensioning the link chain 6, and comprises a clamping pin 10 and a screw element 11 in the form of a nut, by means of which the clamp 4 can be manually closed and tensioned.

The sensor 5 is formed as a load pin 12 and is arranged in a joint 7 between two chain links 8 which are arranged in the center of the link chain 6, i.e. opposite the closure device 9 when the clamp 4 is closed. The force 12a; 12b directed in the direction of the orientation of the link chain 6 can thus be measured, by means of the sensor 5 formed as a load pin, in a linear manner and without buckling or bending, in particular without parasitic shearing forces that falsify the measurement. A processor evaluates the measuring signal of the sensor 5.

In this case, the link chain 6 formed as a plate link chain comprises eight chain links 8, as a result of which it is possible to very precisely follow the contour of the oval cross-section of the casing 2.

The invention is not limited to the embodiment described above. Other embodiments are also possible, which embodiments are also included in the scope of protection of the following claims. It is thus also possible to use fewer than eight, for example three or four, chain links, or many more chain links, for example sixteen or more. Using few chain links allows for a simple structure, or using a large number of chain links allows for a form fit between the link chain and the casing that very precisely follows the contour.

It is also conceivable to provide a plurality of sensors, formed as load pins for example, in order to create redundancies and to increase the accuracy of the measurement.

It is also conceivable for the link chain not to be formed as a plate link chain, but instead as a bush chain or roller chain for example. However, if the sensor is formed as a load pin, it is still particularly preferable for the load pin to be directly operatively connected to two chain links, in the form of a pin for pivotably connecting said chain links, such that the force acting in the link chain is applied to the load pin and not to a bush surrounding said pin.

It is also possible for the closure device to be able to be closed and tensioned not using a bolt rod and a screw element, but instead using a toothed bolt for example.

LIST OF REFERENCE SIGNS 1 pressure measurement device
2 casing
3 fluid
4 clamp
5 sensor
6 link chain 7 joint
8 chain link
8a first chain link
8b final chain link
9 closure device
10 clamping pin
11 screw element
d1 minor axis
d2 major axis

What is claimed is:

1. A pressure measurement device for determining a pressure of
    at least one sensor configured to determine a force acting thereon; and
    a clamp configured for peripheral attachment to the casing, the at least one sensor being arranged inside the clamp and being operatively connected thereto,
    wherein the clamp comprises a peripheral link chain comprising chain links that are pivotably coupled to one another at end joints, and a closure device configured to interact with a first chain link and a final chain link, and
    wherein the at least one sensor comprises a load pin and is arranged in at least one joint and is thus operatively connected as a swivel pin.

2. The pressure measurement device according to claim 1, wherein the closure device comprises a tensioning device configured to close and tension the link chain.

3. The pressure measurement device according to claim 2, wherein the tensioning device comprises at least one screw element configured to tension the tensioning device in a manually adjustable manner.

4. The pressure measurement device according to claim 1, wherein the at least one sensor, comprising the load pin, is arranged in a joint of two central chain links of the link chain.

5. The pressure measurement device according to claim 1, wherein the link chain comprises at least three chain links.

6. The pressure measurement device according to claim 1, wherein the link chain comprises at least eight chain links.

7. The pressure measurement device according to claim 1, wherein the link chain comprises a plate link chain.

8. The pressure measurement device according to claim 1, wherein the chain links are mirror-symmetrical about a plane in which axes of rotation of the two end joints are located.

9. The pressure measurement device according to claim 1, wherein the closure device comprises a clamping pin configured to releasably connect the first chain link to the final chain link.

* * * * *